Patented Oct. 25, 1949

2,486,181

UNITED STATES PATENT OFFICE 2,486,181

PROCESS OF PREPARING CRYSTALLINE SALTS OF PENICILLIN

Lester Larson, Waukegan, Ill., assignor to Abbott Laboratories, North Chicago, Ill., a corporation of Illinois No Drawing. Application October 23, 1946, Serial No. 705,251

12 Claims. (Cl. 260—302)

The present invention relates to penicillin and particularly to improved processes of preparing crystalline salts of penicillin. More specifically, the present invention relates to the preparation of substantially pure, stable alkali metal penicillin salts.

Penicillin is the antibiotic formed during the fermentation of Penicillium notatum in aqueous mediums containing corn steep liquor, lactose, etc. The antibiotic is separated from the "beer" after fermentation by a series of solvent extractions and is generally recovered in salt form, e. g. as the sodium salt from a dilute aqueous sodium hydroxide or sodium bicarbonate extract. The products obtained are amorphous in character and are contaminated by impurities present in the fermenting or growing medium. Most of the available products, for example, are approximately 70 to 80 per cent pure, assaying about 1,000 to 1,300 units per mg.

The impure salts of penicillin prepared as indicated above have been widely used in the treatment of various infections and, for the most part, have proven therapeutically satisfactory. The medical profession, however, has recognized for some time that the presence of impurities possess certain distinct disadvantages. It has been found, for example, where penicillin is administered by a hypodermic needle, that the impurities are not well tolerated in all cases as they produce undesirable side reactions such as irritation at the site of the injection, etc. It has also been found that the impure salts of penicillin are relatively unstable and that storage at refrigerated temperatures is necessary to avoid loss of potency, i. e. lowering of antibiotic activity.

The art, in view of the above, has been attempting to prepare pure penicillin preparations which are free from undesirable side reactions and which are stable and do not require storage at refrigerated temperatures. Various suggestions, including tedious fractional crystallizations from various solvents, have been made, but all have proven impractical due, for example, to poor yields, including degradation of penicillin with resulting loss of activity, failure to remove some of the unwanted impurities, etc. One of the prior suggestions calling for controlled crystallization from butanol, for example, has not been found completely satisfactory, for while products may be obtained in crude (submicroscopic) crystalline form, they are only about 90 per cent pure, assaying approximately 1400 units per mg.

The general object of the present invention is to provide improved processes for preparing substantially pure, stable alkali metal salts of penicillin.

Specific objects of the present invention are to provide commercially feasible methods of producing crystalline alkali metal salts of penicillin which are well tolerated and free from undesirable side reactions and which are stable and do not require storage at refrigerated temperatures.

During the investigation leading to the present invention, I discovered that the alkali metal salts of penicillin are more soluble in cold polar solvents than in warm polar solvents. Upon further investigation I discovered that by dissolving an alkali metal salt, such as the sodium salt of penicillin, in a cold polar solvent, such as methanol, and then warming the resulting solution, that the penicillin salt crystallizes out of the warm solution in substantially pure form as relatively large white crystals. I also discovered that precipitation and recovery of the crystalline salts from solution may be facilitated by the addition to the polar solvent of a non-polar solvent such as acetone. I further discovered that the alkali metal salts prepared in accordance with the process of the present invention as outlined above, are stable and do not require storage at refrigerated temperatures.

The following examples will serve to illustrate the processes of the present invention.

Example I

About 100 grams of amorphous sodium penicillin assaying about 1000 units per mg. is dissolved in about 200 to 250 cc. of anhydrous methanol at a temperature of about —25° C. The resulting cold solution is clarified by filtration or centrifugation to remove any undissolved material and is then slowly warmed to about 25° to 30° C. and maintained at that temperature for several hours. The sodium penicillin precipitate formed is collected, i. e. separated from the methanol, by filtration or decantation. The product recovered is in the form of white crystals assaying about 1650 units per mg.

Additional crystalline sodium penicillin may be obtained by adding acetone, e. g. 1600 to 2000 cc. to the warm methanol solution. This additional product, collected as indicated above, is also in white crystalline form and corresponds to the product recovered from the initial precipitation.

Example II

About 100 grams of amorphous sodium penicillin assaying about 1300 units per mg. is dissolved in about 232 cc. of anhydrous methanol at a temperature of about −25° to −30° C. and the resulting solution centrifuged to remove any undissolved material. To the clear solution is next added about 232 cc. of isopropanol and the mixture then allowed to stand at room temperature for about four hours. The sodium penicillin precipitate formed is next separated from the methanol-isopropanol mixture by filtration and is then washed with isopropanol. The product recovered is in white crystalline form and assays about 1650 units per mg.

*Example III*

About 50 grams of crude crystalline sodium penicillin assaying about 1400 units per mg. is dissolved in about 125 cc. of anhydrous methanol at a temperature of about −25° C. and the resulting solution centrifuged clear and decanted. To the clear solution is next added about 750 cc. of methyl, isobutyl-ketone and the mixture then allowed to warm by standing at room temperature for several hours. The sodium penicillin precipitate formed is next separated from the methanol-methyl, isobutyl-ketone mixture by filtration and is then washed with about 250 cc. of acetone. The product recovered is in white crystalline form and assays about 1650 units per mg.

The process illustrated in Example I calls for the addition of the non-polar solvent after the initial precipitation from the warm polar solvent. The process illustrated in Examples II and III calls for the addition of the non-polar solvent to the cold polar solvent prior to warming and thus provides for one instead of two crystallizations. While methanol is the preferred polar solvent, other inert polar solvents such as ethanol, containing from 5% to 10% of water, isopropanol, containing from 7% to 15% of water, butanol, saturated with water, acetone, containing 3% to 10% water etc. may be employed. The addition of water to organic solvents as mentioned in the previous sentence produces polar solvent mixtures. Other inert non-polar solvents such as ether, benzene, etc., may also be employed in place of acetone, isopropanol, and methyl isobutyl-ketone. The non-polar solvents may be added in varying amounts, although an excess is usually employed to insure the complete precipitation of the desired alkali metal salt.

My investigations have shown that with polar solvents such as methanol that temperatures of about 0° to −50° C. may be employed to dissolve alkali metal salts such as the sodium or potassium salt of penicillin. Ordinarily, it is preferred to employ temperatures of about −10° to −40° C., as at temperatures above −10° C. considerable more solvent is necessary to dissolve a given amount of salt, and at temperatures below −40° C. the solvent becomes rather viscous. The preferred range with solvents such as methanol is about −25° to −30° C. My investigations have also shown that the warm or crystallizing temperatures employed may be about 10° to 35° C. with room temperatures or temperatures of about 20° to 30° C. being preferred. High temperatures should be avoided as my investigations show that the penicillin salt is susceptible to degradation or decomposition at temperatures above 35° C. As the solubility of the alkali metal salts increases as the temperature is lowered, the lowest possible practical temperature should be employed for solution, and as the solubility of the alkali metal salts decreases as the temperature is raised, the highest possible temperature free from degradation should be employed for maximum recoveries.

My investigations to date indicate that the crystalline products obtained by the processes of the present invention are composed chiefly of highly active penicillin G and are substantially free from penicillin K. This latter type penicillin, which is present in some products obtained by the deep vat or submerged fermentation process, has recently been found relatively inactive in vivo.

The crystalline salts which are obtained by the processes of the present invention in good yields are about 96 to 98% pure and assay approximately 1650 units per mg. They are free from undesirable side reactions, and tests have shown them to be stable at ordinary room temperatures. This latter characteristic, which makes storage at refrigerated temperatures unnecessary, helps insure that products which are stored for some time prior to administration will be of high antibiotic activity.

It will be understood that the present invention is not limited to the above illustrative examples. Others may readily adapt the invention for use under various conditions of service by employing one or more of the novel features disclosed or equivalents thereof.

I claim:

1. The process of preparing a substantially pure, stable alkali metal salt of penicillin which comprises dissolving an impure alkali metal penicillin salt in a cold polar solvent at a temperature of about 0 to −50° C., warming the resulting solution to a temperature of about 10 to 35° C. and recovering the alkali metal penicillin salt precipitate formed in the solvent.

2. The process of claim 1 in which a non-polar solvent is added to the polar solvent solution to facilitate precipitation of the alkali metal penicillin salt.

3. The process of preparing a substantially pure, stable alkali metal salt of penicillin which comprises dissolving an impure alkali metal penicillin salt in cold methanol at a temperature of about −25 to −30° C., warming the resulting solution to a temperature of about 20 to 30° C. and recovering the alkali metal penicillin salt precipitate formed in the methanol.

4. The process of claim 3 in which an inert non-polar solvent is added to the methanol solution to facilitate precipitation of the alkali metal penicillin salt.

5. The process of preparing a substantially pure, stable sodium salt of penicillin which comprises dissolving an impure sodium penicillin salt in an inert polar solvent at a temperature of about −10 to 40° −C., warming the resulting solution to a temperature of about 10 to 35° C. and recovering the sodium penicillin salt precipitate formed in the warmed solvent.

6. The process of preparing a substantially pure, stable sodium salt of penicillin which comprises dissolving sodium penicillin contaminated by impurities in cold methanol at a temperature of about −10 to −40° C., warming the resulting solution to a temperature of about 10 to 35° C. and recovering the sodium penicillin salt precipitate formed in the warmed methanol.

7. The process of preparing a substantially pure, stable sodium salt of penicillin which comprises dissolving sodium penicillin contaminated by impurities in cold methanol at a temperature of about −25 to −30° C., separating the undissolved material from the solution, warming the clear solution to a temperature of about 20° to 30° C. and recovering the sodium penicillin salt precipitate from the methanol.

8. The process of claim 7 in which acetone is added to the methanol solution to facilitate precipitation of the sodium penicillin salt.

9. The process of claim 7 in which isopropanol is added to the methanol solution to facilitate precipitation of the sodium penicillin salt.

10. The process of claim 7 in which methyl, isobutyl-ketone is added to the methanol solution to facilitate precipitation of the sodium penicillin salt.

11. The process of preparing a substantially pure, stable sodium salt of penicillin which comprises dissolving impure sodium penicillin in methanol at a temperature of about −25° C., warming the resulting solution to about room temperature and recovering the sodium penicillin salt precipitate in the warmed methanol.

12. The process of preparing a substantially pure sodium salt of penicillin which comprises dissolving sodium penicillin contaminated by impurities in methanol at a temperature of about −25° to −30° C., removing any undissolved material from the solution, slowly warming the clear solution to a temperature of about 25° to 30° C., and recovering the sodium penicillin salt precipitate formed from the warmed methanol.

LESTER LARSON.

REFERENCES CITED

The following references are of record in the file of this patent:

Pfizer & Co. Report, Summary of Purification Studies on Penicillin up to December 24, 1943, pages 3 and 4.
Abbott Report A–I, page 10, Dec. 30, 1943.
Ind. & Eng. Chemistry, December 1943, page 5.
British Report XIX, January 14, 1944, page 3.
Abbott Report A–III, page 3, Feb. 14, 1944.
Abbott, "Penicillin," 1944, page 48.